UNITED STATES PATENT OFFICE.

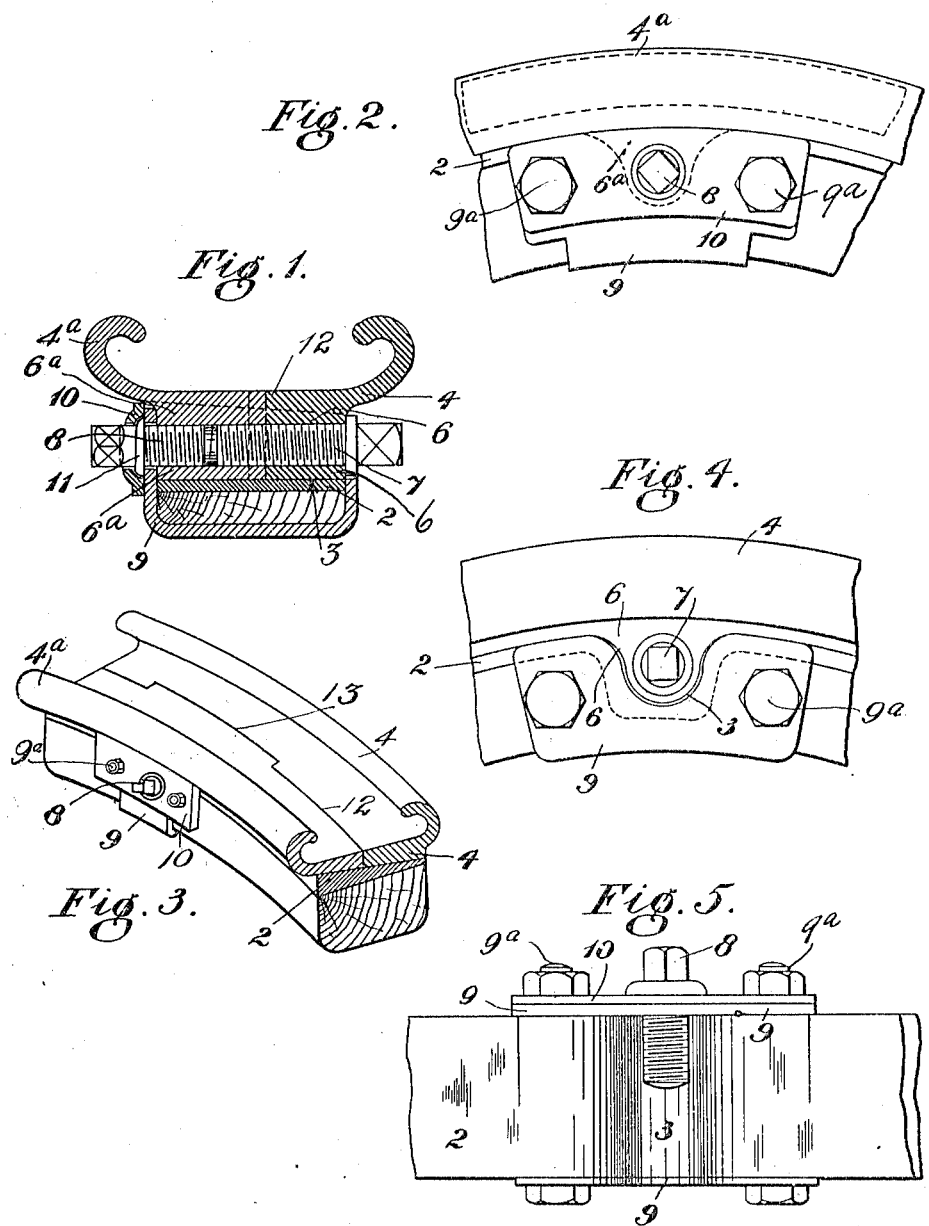

GEORGE WEBB, OF MONMOUTH, ENGLAND, ASSIGNOR TO THE SPENCER MOULTON RIM SYNDICATE LIMITED, OF LONDON, ENGLAND.

RIM FOR THE ROAD-WHEELS OF VEHICLES.

983,789.

Specification of Letters Patent.  Patented Feb. 7, 1911.

Application filed December 17, 1908. Serial No. 467,997.

*To all whom it may concern:*

Be it known that I, GEORGE WEBB, subject of Great Britain, residing at Monmouth, Wales, England, have invented new and useful Improvements in Rims for the Road-Wheels of Vehicles, of which the following is a specification.

This invention relates to tire-carrying rims of the circumferentially split or divided type and has for its object to provide an improved arrangement whereby either the whole or one part only of the rim may be readily detached from the wheel. The arrangement is also such that when desired the rim may be carried complete as a spare rim.

The invention consists in the special combination and arrangement of parts as hereinafter specifically described and claimed, and in order that the invention may be clearly understood reference is made in describing the same to the accompanying drawings, wherein—

Figure 1, represents a cross sectional view through one of the bosses of the rim constructed according to this invention. Fig. 2, represents a side view of a portion of the wheel showing one of the bolts whereby the rim is drawn onto the felly. Fig. 3, is a perspective view of a portion of the rim and felly showing the contacting tapered surfaces. Fig. 4, represents a side view of the rim and felly showing one of the bolts which fasten the two parts of the rim together. Fig. 5, is a plan of the felly *per se*.

Like parts are designated by the same reference characters throughout the drawings.

Referring to the drawings, the periphery of the wheel is faced with a fixed metal rim 2 the upper surface of which is coned or tapered transversely and also formed at four or more equidistantly spaced points with the transverse grooves 3. The removable rim which carries the tire is split or divided circumferentially into two parts, 4, 4ᵃ at or about the center line and its inner periphery is coned or tapered transversely to correspond with the coned outer surface of the rim 2 with which it is adapted to make a close contact. Each part of the rim is formed on its inner periphery with a series of four or more equidistantly placed transverse hollow bosses 6, 6ᵃ which when the rim is placed in position on the wheel occupy the aforesaid grooves 3 in the rim and prevent the rim creeping on the wheel. The bosses 6 on one part of the rim register with and virtually form continuations of the bosses 6ᵃ, on the other part of the rim. The two parts of the rim are secured together in their proper relative positions by a set of screws 7 which pass through the suitably tapped holes in the bosses 6 on the part 4 of the rim and enter the inner ends of the correspondingly tapped holes in the bosses 6ᵃ, on the other part 4ᵃ of the rim, as shown in Fig. 1. The complete rim when placed on the wheel is drawn into close contact with the rim 2 by a second set of screws 8 which pass through and are carried by perforated brackets 9 fixed by bolts 9ᵃ to the face of the wheel. Said second set of screws 8 enter the outer ends of the bosses 6ᵃ on the said other part 4ᵃ of the rim.

The screws 8 are each prevented from being withdrawn so as to become loose parts by means of a plate 10 secured by the bolts 9ᵃ to the brackets 9 and engaging behind a collar 11 on the screw, as shown in Figs. 1 and 2. By means of this arrangement rotation of the screws 8 in one direction draws the contacting coned surfaces of the fixed and removable rims close together while opposite rotation of said screws forces the said surfaces away from each other so that the removable rim may be readily slipped off the fixed rim.

The contacting surfaces of the rim and felly in the immediate vicinity of the grooves and bosses are preferably formed parallel and the circumferential division 12 of the rim is staggered or set out at one or more parts 13, as shown in Fig. 3, for several reasons, firstly to lock the two parts of the rim together circumferentially and to insure same when put together occupying their proper relative positions, and secondly, to provide for the fastening screws 7 entering an appreciable distance into the bosses 6ᵃ while at the same time leaving sufficient room therein for the inner ends of the screws 8. In the event of a punctured tire, or where for any other reason it is desired to remove the tire from the rim the latter may either be divided while on the wheel by taking out or slacking the screws 7 or the rim may be detached bodily from the wheel and subsequently divided to facilitate the detachment of the tire therefrom. The outer ends of the screws 7 and 8 are preferably squared as shown to take a key.

What I claim and desire to secure by Letters Patent of the United States is—

1. The combination with a fixed rim that is transversely beveled or coned and is provided with a plurality of transverse recesses, of a removable tire carrying rim that fits thereon and is correspondingly beveled or coned, said removable rim comprising detachably associated ring sections, a series of hollow internally screw threaded bosses carried by the inner sides of the removable rim sections, and a plurality of screws located in each recess of the fixed rim, one of said screws connecting the two parts of the rim together, and the other constituting means for securing the removable rim to the wheel.

2. The combination with a wheel having a permanent rim thereon, said rim having transverse recesses, of a removable two-part rim located over the first mentioned rim, each part being provided with alined bosses disposed in the recesses, bolts extending on one side of the wheel and engaging the bosses of both parts of the removable rim for securing said parts together, and bolts rotatably mounted on the other side of the wheel and engaging the bosses of one of the parts for effecting the movement of the removable rim on the fixed rim.

3. The combination with a fixed rim having transverse recesses, of a two-part removable rim surrounding the fixed rim and having threaded bosses disposed in the recesses, bolts threaded through the bosses of one part of the removable rim into the bosses of the other part, and bolts rotatably mounted on the fixed rim and detachably engaging the bosses of the second part of the removable rim.

4. The combination with a fixed rim having transverse recesses, of a removable two-part rim surrounding the same, both parts of the removable rim having internally threaded bosses located in each transverse recess, bolts connecting the bosses for securing the parts of the removable rim together, brackets mounted on the fixed rim, and bolts rotatable in the brackets and engaging certain bosses of the removable rim for effecting the transverse movement of said removable rim on the fixed rim.

In testimony whereof I have signed my name to this specification in the presence of two subscribing witnesses.

GEORGE WEBB.

Witnesses:
I. G. NORTON,
J. GROOM.